US006075241A

United States Patent [19]
Tsai et al.

[11] Patent Number: 6,075,241
[45] Date of Patent: Jun. 13, 2000

[54] SCANNING MODULE WITH TWO OPPOSITELY MOVABLE LENSES FOR CHANGING SCAN RESOLUTION

[75] Inventors: Jern-Tsair Tsai, Taipei Hsien; Bill Chen, Ping-Tung, both of Taiwan

[73] Assignee: Mustek Systems Inc., Hsin-Chu, Taiwan

[21] Appl. No.: 09/187,195

[22] Filed: Nov. 3, 1998

[51] Int. Cl.[7] ................................. H01J 3/14; H01J 5/16; H01J 40/14
[52] U.S. Cl. ...................... 250/234; 235/462.22
[58] Field of Search ........................ 250/234; 235/462.22

[56] References Cited

U.S. PATENT DOCUMENTS 5,854,713  12/1998  Kuroda ..................................... 250/234

*Primary Examiner*—Harold I. Pitts
*Attorney, Agent, or Firm*—Winston Hsu

[57] ABSTRACT

The present invention relates to an optical scanning module with two movable lenses that move in opposite directions thus providing two different scanning resolutions. The scanning module comprises a housing with a window which receives light from the document, an optical sensing device for converting the light into corresponding image signals, and a lens module for converging the light onto the optical sensing device. Two parallel tracks are installed within the lens module, each containing a movable lens. A driving device moves either one of the two lenses into the optical track allowing light to be converged through this lens onto the optical sensing device. Each of the two lenses provide different scanning resolutions and methods for converging light.

6 Claims, 4 Drawing Sheets

SCANNING MODULE WITH TWO OPPOSITELY MOVABLE LENSES FOR CHANGING SCAN RESOLUTION

BACKGROUND OF THE INVENTION

1. Field of the invention

The present invention relates to an optical scanning module, and more particularly, to an optical scanning module with two oppositely movable lenses for changing scan resolution.

2. Description of the Prior Art

Due to advancements in computer hardware and software technology and the increasing need and demand of graphic image processing, optical scanners are rapidly gaining popularity. Of all of the many varieties of scanners, flatbed scanners are the most commonly used scanners. A flatbed scanner comprises a scanning module for scanning a document. Since a scanning module only has a single lens with only one resolution, users who need to scan documents at different resolutions need other options. Therefore, much research is being done to develop scanning modules with multiple lenses to permit more than one scanning resolution.

Please refer to FIG. 1 and FIG. 2. FIG. 1 and FIG. 2 are schematic diagrams of prior art scanning modules with two lenses. The scanning module 10 is movably installed in an optical scanner (not shown) for scanning a document 12. The scanning module 10 comprises a housing 14 with a window 16 for receiving light 18 transmitted from the document 12, an optical sensing device 20 installed within the housing 14 for converting the light 18 into image signals, and a lens module 22 installed in the housing 14 for converging the light 18 onto the optical sensing module 20. The lens module 22 comprises two parallel tracks 24, 26 installed in front of the optical sensing device 20, two plastic housings 32,34 movably installed on the two parallel tracks 24,26 respectively, two lenses 28,30 installed within the two plastic housings 32,34, respectively, for providing two different resolutions in converging the light 18 onto the optical sensing device 20, and a driving device 36 installed within the housing 14 for simultaneously driving the lenses 28, 30 in the two plastic housings 32, 34 and using one of these lenses to converge the light 18.

The scanning module 10 is equipped with two lenses 28,30 for providing the capability of scanning at more than one resolution. These two lenses are arranged in such a way as to prevent mutual interference, allowing light 18 to pass through only one of the two lenses 28,30 at a time. During operation of the scanner, however, the two plastic housings 32,34 move in the same direction simultaneously thereby necessitating wide placement of the two parallel tracks 24,26 and a large overall volume within the scanning module 10.

SUMMARY OF THE INVENTION

It is therefore a primary objective of the present invention to provide an optical scanning module with two lenses that are movable in opposite directions to solve the above mentioned problem.

In a preferred embodiment, the present invention provides a scanning module comprising:

a housing having a window for receiving light from the document;

an optical sensing device installed in the housing for converting light from the document through a predetermined optical track into corresponding image signals;

a lens module installed in the housing comprising:

two parallel tracks installed in front of the optical sensing device;

two lenses of different focuses movably installed on the two parallel tracks separately for converging the light onto the optical sensing device at two different resolutions; and a driving device for moving both of the two lenses at the same time and allowing one of the lenses to be positioned on the optical track at one time to converge the light from the document onto the optical sensing device.

After the scanning module is in focus, the driving device moves the two lenses in opposite directions and moves one of the two lenses into the optical track to converge light transmitted from the document onto the optical sensing device.

It is an advantage of the present invention that the scanning module is able to provide scanning at different resolutions with a reduction in overall size.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figures 1, 2:
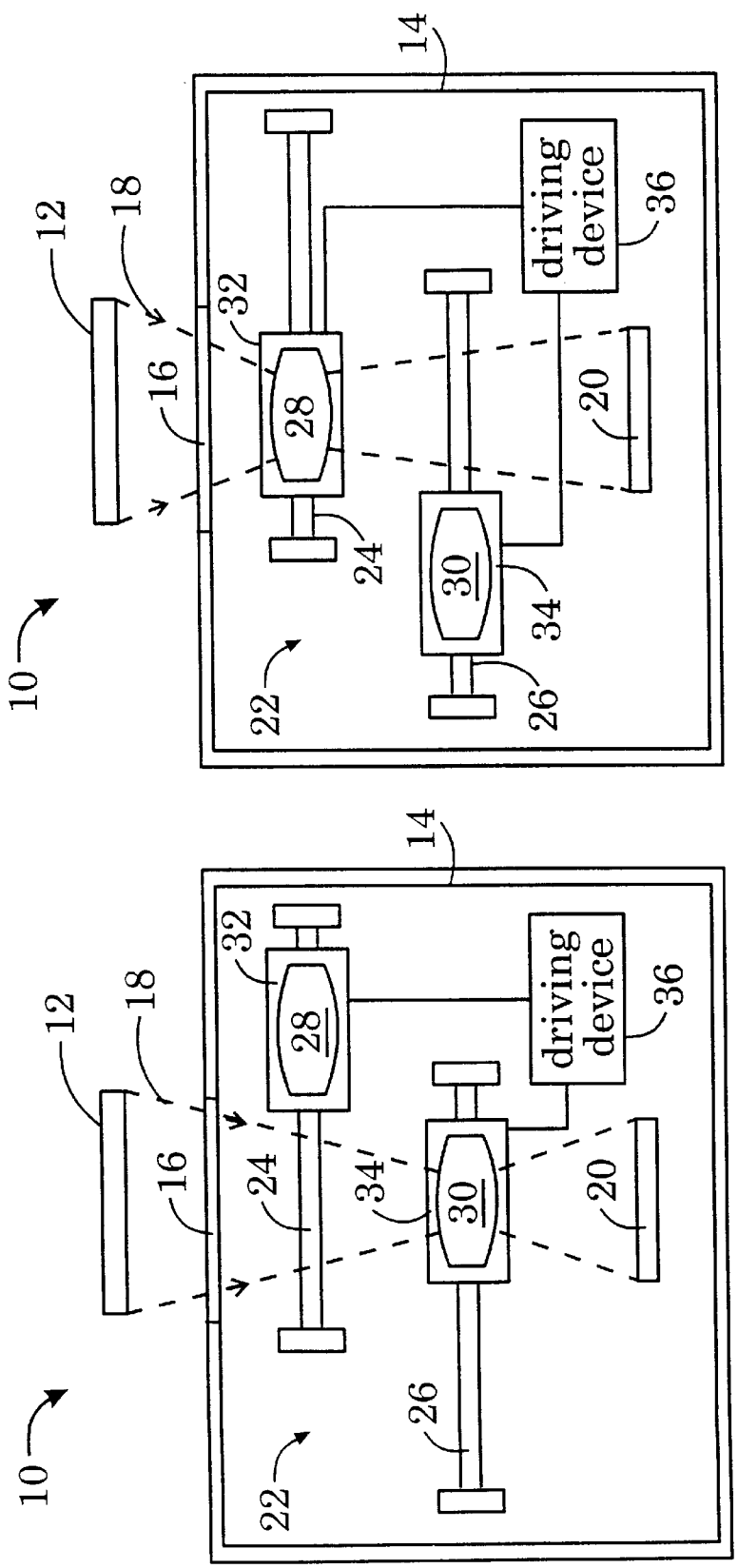
FIG. 1 and FIG. 2 are schematic diagrams of scanning modules with two lenses according to the prior art.
Figure 3:
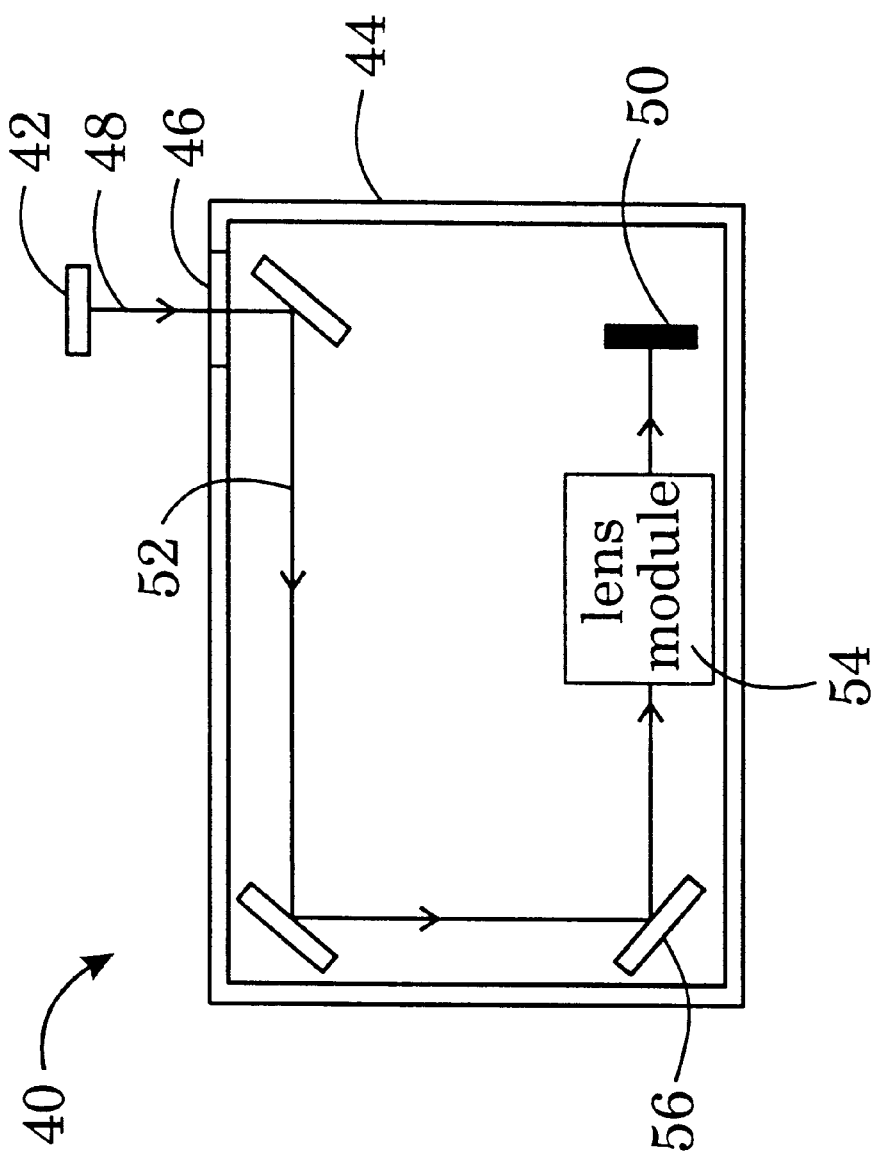
FIG. 3 is a schematic diagram of scanning module according to the present invention.

Please refer to FIG.3. FIG. 3 is a schematic diagram of the scanning module 40 according the present invention. The scanning module 40 is used in an optical scanner (not shown) for scanning a document 42. The scanning module 40 comprises a housing 44 having a window 46 for receiving light 48 from the document 42, a mirror module 56 installed within the housing 44 comprising a plurality of mirrors for passing the light 48 through a predetermined optical track 52, an optical sensing device 50 installed within the housing 44 for converting light 48 into corresponding image signals, and a lens module 54 installed within the housing 44 for converging the light 48 onto the optical sensing device 50. During scanning of the document 42, the lens module 56 converges the light 48 from the document 42 through the optical track 52 onto the optical sensing device 50. The optical sensing device 50 then converts the converged light 48 into corresponding image signals.

Figure 4:
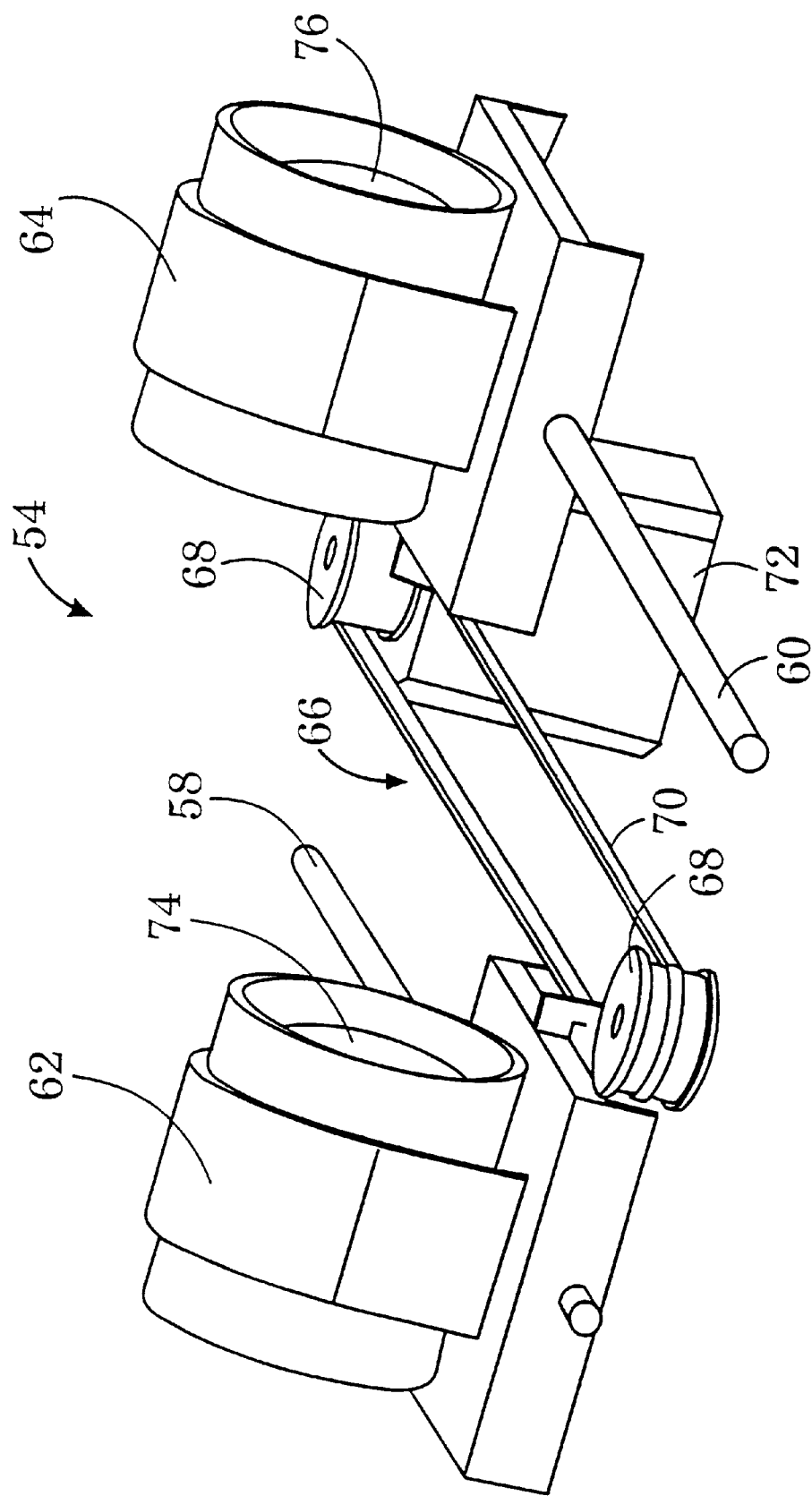
FIG. 4 is perspective diagram of the scanning module shown in FIG. 3.

Please refer to FIG. 4. FIG. 4 is a schematic diagram of the lens module 54. The lens module 54 comprises two parallel tracks 58,60 installed in front of the optical sensing device 50, two plastic housings 62,64 movably installed on the two parallel tracks 58,60 respectively, two lenses 74,76 installed within the two plastic housings 62,64 respectively for scanning at two different resolutions, and a driving device 66 installed within the housing 44 for moving the lenses 74, 76 and positioning one of these lenses in the optical track 52.

The driving device 66 comprises two pulleys 68 rotatably fixed at the two ends of the two parallel tracks 58,60, a circular belt 70 mounted on the two pulleys 68 for moving the two plastic housings 62,64, and a motor 72 for driving the two pulleys 68 and the circular belt 70. The plastic housings 62,64 are installed at opposite ends of the circular belt 70. When the belt is moved, the two plastic housings 62,64 move in opposite directions.

Figure 6:
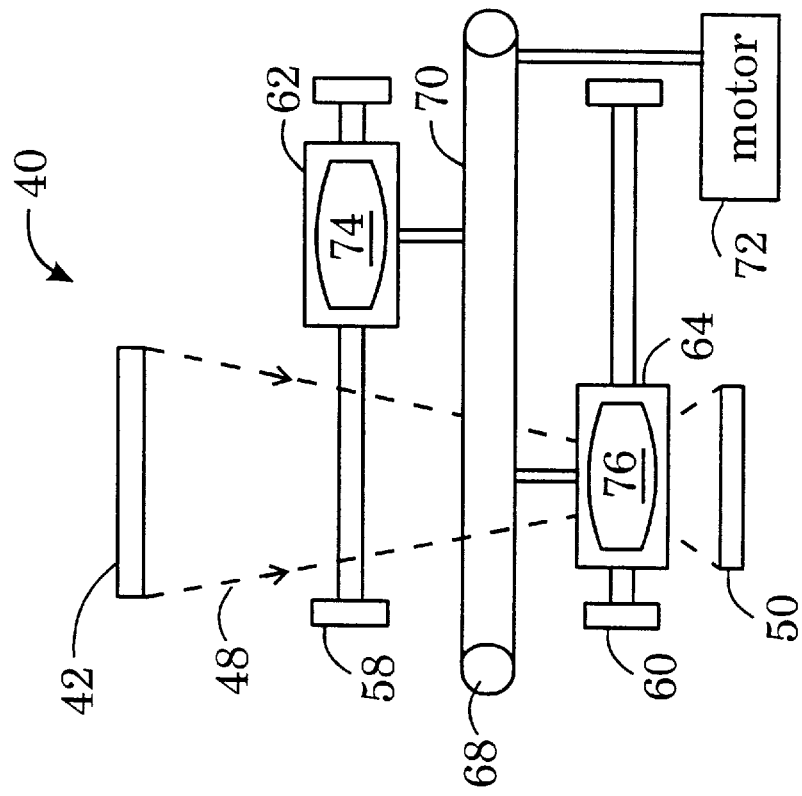
FIG. 5 and FIG. 6 are the schematic diagrams of the scanning module shown in FIG. 3.
Figure 5:
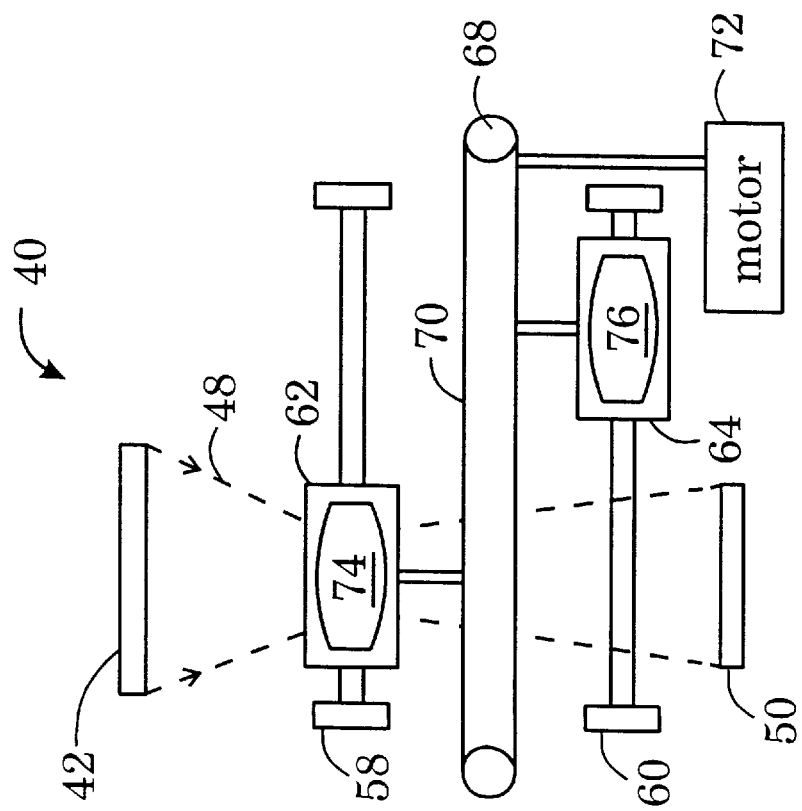

Please refer to FIG. 5 and FIG. 6. FIG. 5 and FIG. 6 are schematic diagrams of the lens 74 or 76 as used in the scanning module 40. FIG. 5 shows that if lens 74 is used, the driving device 66 moves the plastic housing 64 to the right side of track 60 away from the optical track 52 and moves the plastic housing 62 to the left side of track 58 into the optical track 52 to converge light 48 onto the optical sensing device 50. Conversely, FIG. 6 shows that if lens 76 is used, the driving device 66 moves the plastic housing 62 to the right side of track 58 away from the optical track 52 and moves the plastic housing 64 to the left side of track 60 into the optical track 52 to converge light 48. Using this scheme, during scanning, the two plastic housings 62,64 are positioned at opposite ends of two parallel tracks 58,60 and thus there is no interference between the two lenses 74,76. The light then passes through only one of the lenses 74 or 76.

In the present invention, the driving device 66 moves the two lenses 74 and 76 of the scanning module 40 in opposite directions. This design reduces the space needed by the two parallel tracks 58,60. Therefore, the overall volume of the scanning module is also reduced.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A scanning module of a scanner for sinning a document, the scanning module comprising:

a housing having a window for receiving light from the document;

an optical sensing device installed in the housing for converting light from the document through a predetermined optical track into corresponding image signals; and a lens module installed in the housing comprising:

two parallel tracks installed in the housing in front of the optical sensing device;

two lenses of different focuses movably installed on the two tracks separately; and a driving device installed in the housing for moving both of the two lenses in the same time and allowing one of the lenses be positioned on the optical track at one time to converge the light from the document onto the optical sensing device;

wherein the two lenses converge the light from the document onto the optical sensing device differently so as to provide two different scanning resolutions.

2. The scanning module of claim 1 further comprising two plastic housings movably installed on the two tracks wherein the two lenses are mounted in the two plastic housings separately.

3. The scanning module of claim 1 wherein the driving device comprises two pulleys rotatably fixed at the two ends of the two parallel tracks, and a circular belt mounted on the two pulleys with the two lenses connected to it for moving the two lenses.

4. The driving device of claim 3 wherein the two lenses are connected to two opposite sides of the circular belt so that when the circular belt is rotated, the two lenses will move toward opposite directions.

5. The driving device of claim 4 further comprising a motor for rotating the circular belt.

6. The scanning module of claim 1 further comprising a mirror module installed in the housing which comprises a plurality of reflective mirrors for passing the light from the document onto the optical sensing device.

\* \* \* \* \*